United States Patent Office 3,536,730
Patented Oct. 27, 1970

3,536,730

1,3-BIS-(5-SULFOBENZIMIDAZOLYL-2)-BENZENE AND SALTS THEREOF

Heinrich Baron, Joachim Kath, and Wilhelm Doeller, Darmstadt, Germany, assignors to E. Merck A.G., Darmstadt, Germany

No Drawing. Filed Aug. 22, 1967, Ser. No. 662,293
Claims priority, application Germany, Aug. 27, 1966, M 70,736
**Int. Cl. C07d *49/38***
U.S. Cl. 260—309.2 3 Claims

ABSTRACT OF THE DISCLOSURE

As absorbents of UV radiation, especially in the range of 280–320 mμ, there are provided 1,3-bis-(5-sulfobenzimidazolyl-2)-benzene and salts thereof, e.g. alkali metal, ammonium, and ethanolamine salts. These novel compounds are produced by sulfonating 1,3-bis-(5-sulfobenzimidazolyl-2)-benzene, the latter being prepared, for example, by reducing isophthalic acid di-o-nitranilide. The novel compounds are effective protective agents against sunburn and can be formulated in conventional forms of application.

This invention relates to sulfonated imidazoline derivatives and their use as UV-absorbents, particularly as sunburn preventives.

It is well known that sufficient exposure to UV-radiation of about 280–320 mμ results in "erythema solare," the medical term for sunburn. In contrast thereto, long-wave UV-radiation in a range of more than 320 mμ tans the skin without signs of burning, and even exerts a therapeutic effect in certain diseases, such as rachitis. Consequently, an efficacious radiation-protective agent should absorb radiation in the erythema-forming range of 280–320 mμ as completely as possible, but allow the radiation of above 320 mμ to penetrate. Furthermore, according to more recent findings, it is most favorable if the maximum absorption efficiency of the protective agent occurs at 307 mμ.

A principal object of this invention, therefore, is to provide chemical compounds which are particularly suitable as selective absorbents for certain wavelengths of UV-radiation.

Another object is to provide one or more processes for the production of such chemical compounds.

Still further objects are to provide cosmetic anti-sunburn preparations, and also methods of preventing sunburn by topically administering the compounds of this invention to mammals susceptible to sunburn.

Upon further study of the specification and claims, other objects and advantages of the present invention will become apparent.

To attain these objects, there are provided the novel compound 1,3-bis-(5-sulfobenzimidazolyl-2)-benzene and salts thereof. Such compounds have been discovered to exhibit UV-absorption characteristics which are optimum for use in anti-sunburn agents. By being compatible with cosmetically acceptable carriers and the like, and exhibiting no adverse physiological reaction to the skin, the compounds of this invention can be readily incorporated in all types of anti-sunburn preparations.

To illustrate the advantageous absorption characteristics of 1,3-bis-(5-sulfobenzimidazolyl-2)-benzene, it is compared in the following table with 2-phenyl-benzimidazole-5-sulfonic acid, the latter already being known as a highly effective absorbent of UV-radiation in connection with anti-sunburn preparations. The values in the table are based on a solution thickness of 1 cm., and an aqueous solution concentration of 0.001% by weight of the active agent.

| Wavelength of UV-radiation (mμ) | Percent radiation absorbed | |
|---|---|---|
| | 1,3-bis-(5-sulfobenzimidazolyl-2)-benzene | 2-phenyl-benzimidazole-5-sulfonic acid |
| 280 | 65 | 67 |
| 290 | 82 | 82 |
| 300 | 90 | 88 |
| 305 | 92 | 87 |
| 310 | 90.5 | 78 |
| 320 | 80 | 45 |
| 330 | 25 | 0 |
| 350 | 2 | 0 |

It can be seen from the above absorption data that 1,3-bis-(5-sulfobenzimidazolyl-2)-benzene absorbs more strongly between 280 and 320 mμ than the known compound. The absorption maximum (92% absorption) is about 307 mμ for 1,3-bis-(5-sulfobenzimidazolyl-2)-benzene, whereas the known compound exhibits the strongest absorption (89%) at about 302 mμ.

The structural formula of 1,3 - bis - (5-sulfobenzimidazolyl-2)-benzene is:

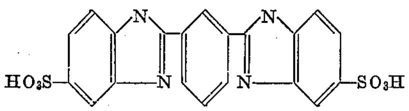

In addition to the above, there can be employed all topically physiologically compatible salts of this compound. For example, there are included those salts of inorganic bases, particularly the water-soluble salts such as the ammonium salt and the alkali metal salts, e.g., the sodium or potassium salt. Salts of organic bases can also be used, for example the mono-, di-, or triethanolamine salt.

If desired, a mixture of several of the above compounds can be employed.

The active agents of this invention are generally incorporated in a concentration of about 1 to 10%, preferably 2 to 5% by weight in forms conventional to cosmetic or medicinal UV-protective or suntan preparations, for example, in the form of sprays, solutions, creams, semisolids, solids, gels, salves, ointments, emulsions, sticks, etc.

Cosmetically acceptable carriers or additives include, for example, water; physiologically harmless alcohols, such as ethanol, isopropanol, cetyl, stearyl, or palmityl alcohol; glycols, such as ethylene glycol, glycerin, sorbitol, which can serve as moisturizers; fatty acids and fatty acid esters, such as stearic acid, palmitic acid, oleic acid, glyceryl mono- and distearate, glyceryl mono-oleate, isopropylmyristate, isopropylstearate, butylstearate; vegetable or animal oils and fats, such as olive, peanut, sesame, or almond oil, cocoa butter, beeswax, fossil wax (cerine), or carnauba wax, lanolin, or spermaceti oil; hydrocarbons, such as solid or liquid paraffin, ceresin, montan wax; emulsifiers or other cream foundations of either water-in-oil or oil-in-water systems, there being usable as the emulsifiers the commercial emulsifying agents (ionic or nonionic, cationic, or anionic, or ampholytic), for example, cetyl sulfate, "Eucerin" (a mixture of 5% lanolin alcohols and 95% aliphatic hydrocarbons), sorbitan fatty acid esters, polyoxyethylene sorbitan fatty acid esters, fatty alcohol polyglycol ethers, fatty acid polyglycol esters; thickening agents, such as methyl, ethyl, or carboxymethyl cellulose, carboxyvinyl polymers and the salts thereof, gelatin, tragacanth, pectins, agar-agar, etc. This list is not intended to be exclusive as no doubt other carriers can be employed.

Suitable propellants for aerosols are, in particular, lower hydrocarbons substituted by fluorine and chlorine, such as trichlorofluoromethane, dichlorodifluoromethane, and 1,1,2,2-tetrafluorodichloroethane. Though not as popular today, nitrogen, carbon dioxide, propane, butane, and other inert gases can be employed.

Aside from carriers and moisturizers, other additives can be incorporated into the anti-sunburn preparations, for example: perfumes, such as lavender oil, attar of roses, cloves oil, lemon oil, or perfume compositions, physiologically harmless dyestuffs, preservatives, such as the methyl and the n-propyl ester of p-hydroxybenzoic acid, antioxidants, and other skin conditioning agents, surface-active substances, or insect repellents, such as caprylic acid-N,N-diethylamide, caprylic acid hexamethylenimide, m-toluic acid-N,N-diethylaminde, dimethyl phthalate, 2-ethyl-1,3-hexanediol, and butoxypolypropylene glycol.

If desired, the anti-sunburn preparations of this invention can have other additional UV-absorbents incorporated therein, for example, 2-phenyl-benzimidazole-5-sulfonic acid sodium salt, 3,4-dimethyl-phenylglyoxylic acid sodium salt, 4-phenyl benzophenone, and 4-phenyl-benzophenone-2′-carboxylic acid isooctyl ester.

Generally, the cosmetic preparations are characterizable as viscous to solid forms.

Although the cosmetic field is the principal application for the novel compounds of this invention, they are also useful as UV-absorbents in technical and industrial areas, particularly wherein aqueous systems are found. For example, such areas include, but are not limited to, the manufacture of foils from regenerated cellulose, which are used to wrap light-sensitive food-stuffs and the like.

To avoid sunburn, an effective amount of the active agent must be applied to the skin, this amount varying with the intensity and duration of the UV-source, as well as with the complexion of the person's skin. In general, however, it is estimated that an application of about 10 to 100 mg. of active agent per 100 square centimeters of skin surface should prevent sunburn for approximately 2–4 hours under direct midday summer light radiating in the northern temperate zone.

The novel compound 1,3-bis-(5-sulfobenzimidazolyl-2)-benzene is prepared by sulfonation of 1,3-bis-(benzimidazolyl-2)-benzene with a conventional sulfonation agent, such as, for example, chlorosulfonic acid in sulfuric acid. The unsulfonated starting material can be produced, for example, (A) by condensing 2 equivalents of o-phenylenediamine with one equivalent of isophthalic acid in the presence of a condensation agent such as, for example, polyphosphoric acid; (B) by condensing o-phenylenediamine with a reactive derivative of isophthalic acid, such as the acid chloride, anhydride, or amide, or with isophthalic aldehyde; or (C) by reducing isophthalic acid di-o-nitranilide.

The salts of 1,3-bis-(5-sulfobenzimidazolyl-2-)-benzene can be produced, for example, by neutralizing the acid with the corresponding base, for example an alkali hydroxide, such as sodium hydroxide or potassium hydroxide, or with ammonia, or with mono-, di-, or triethanolamine.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

The preparation of the active agent of this invention is described in the following example.

EXAMPLE A 11 parts (by weight) of 1,3-bis-(benzimidazolyl-2)-benzene are introduced in batches, within about 1.5 hours, under stirring and water cooling, into 77 parts of sulfuric acid monohydrate. Thereafter, 8.4 parts of chlorosulfonic acid are added dropwise; then the reaction mixture is stirred for 45 minutes at 100° C. After cooling, the mixture is poured into water, allowed to stand overnight, vacuum-filtered, and washed with water. The crude product is purified by dissolving same in a solution of sodium hydroxide, adding methanol, treating with activated charcoal, filtering, and precipitation with hydrochloric acid. There are obtained 16.7 parts of 1,3-bis-(5-sulfobenzimidazolyl-2)-benzene in the form of a bright gray powder which does not melt until 250° C.

In the following examples, preparations are set forth having the light protective effect according to this invention. The values are in parts by weight. In place of the specific salts employed, it is also possible to use other salts of 1,3-bis-(5-sulfobenzimidazolyl-2)-benzene. Furthermore, if desired or if necessary, conventional additives can be incorporated, for example, perfume, dyestuffs, preservatives.

(1) Aqueous-alcoholic solution

| | |
|---|---|
| Triethanolamine salt of 1,3-bis-(5-sulfobenzimidazolyl-2)-benzene | 3 |
| Isopropanol | 20 |
| Glycerin | 3 |
| Sorbitol 70% | 3 |
| Water | 71 |

(2) Light protective gel

| | |
|---|---|
| Sodium salt of 1,3 - bis-(5-sulfobenzimidazolyl-2)-benzene | 5 |
| Polyacrylic acid, sodium salt | 1 |
| Fatty alcohol polyglycol ether | 0.5 |
| Water | 94 |

(3) Cream (water/oil)

| | |
|---|---|
| Triethanolamine salt of 1,3-bis-(5-sulfobenzimidazolyl-2)-benzene | 2 |
| Fat-soluble light protective agent, for example, 4-phenyl-benzophenone - 2′ - carboxylic acid isooctyl ester | 2 |
| Lanolin (wool fat) | 50 |
| Water | 46 |

(4) Cream (oil/water)

| | |
|---|---|
| Triethanolamine salt of 1,3-bis-(5-sulfobenzimidazolyl-2)-benzene | 3 |
| Stearic acid | 15 |
| Beeswax | 1 |
| Spermaceti | 1.5 |
| Cetyl alcohol | 1.5 |
| Triethanolamine | 1 |
| Glycerin | 3 |
| Sorbitol solution 70% | 6 |
| Water | 68 |

(5) Cream

| | |
|---|---|
| 1,3-bis-(5-sulfobenzimidazolyl-2)-benzene | 1 |
| 4 - phenyl-benzophenone-2′-carboxylic acid isooctyl ester | 2 |
| Cream base (fatty alcohol-fatty alcohol sulfate mixture) | 15 |
| Vaseline, white | 3 |
| Oleic acid oleyl ester | 5 |
| High-molecular fatty alcohol | 5 |
| Lanolin | 1 |
| Sorbitol solution 70% | 10 |
| Monoethanolamine | 0.3 |
| Water | 58 |

(6) Foam-spray with repellent effect

| | |
|---|---|
| 1,3-bis-(5-sulfobenzimidazolyl-2)-benzene | 3 |
| 4 - phenyl-benzophenone-2′-carboxylic acid isooctyl ester | 2 |
| Emulsifier (ethoxylated fatty alcohol) | 3 |
| Stearic acid | 4 |
| Glyceryl monostearate | 1 |
| Oleic acid diethanolamide | 2 |
| Liquid paraffin | 7.5 |
| Monoethanolamine | 1.5 |

| | |
|---|---|
| Caprylic acid hexamethylenimide | 10 |
| Water | 66 |
| 1,1,2,2-tetrafluorodichloroethane | 12 |
| Dichlorodifluoromethane | 8 |

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A compound selected from the group consisting of 1,3 - bis - (5 - sulfobenzimidazolyl-2)-benzene and the physiologically acceptable salts thereof.

2. A compound as defined by claim 1 wherein said compound is 1,3 - bis-(5-sulfobenzimidazolyl-2)-benzene.

3. A compound as defined by claim 1 wherein said physiologically acceptable salts are selected from the group consisting of sodium, potassium, ammonium, monoethanolamine, diethanolamine, and triethanolamine salts.

References Cited

UNITED STATES PATENTS 2,463,264 3/1949 Graenacher et al. ---- 260—309.2

OTHER REFERENCES

Schuetze et al.: Chem. Abst., vol. 61, columns 8295–6 (1964).

Vogel et al.: Jour. Polymer Sci. Pt. A., vol. 1, page 1540 relied on (1963).

Wang et al.: Chem. Abst., vol. 52, columns 5387–8 (1958).

NATALIE TROUSOF, Primary Examiner

U.S. Cl. X.R.

424—60